(12) United States Patent
Roseliep

(10) Patent No.: US 6,648,568 B2
(45) Date of Patent: Nov. 18, 2003

(54) LINEAR BLIND BROACHING MACHINE

(75) Inventor: Robert E. Roseliep, Grosse Pointe, MI (US)

(73) Assignee: Utica Enterprises, Inc., Shelby Township, Macomb County, MI (US)

( * ) Notice: Subject to any disclaimer, the term of this patent is extended or adjusted under 35 U.S.C. 154(b) by 103 days.

(21) Appl. No.: 09/764,933

(22) Filed: Jan. 18, 2001

(65) Prior Publication Data

US 2002/0094251 A1 Jul. 18, 2002

(51) Int. Cl.$^7$ .............................. B23D 1/08; B23D 7/10
(52) U.S. Cl. .................. 409/254; 409/251; 409/257; 409/268; 409/270; 409/285; 409/286; 409/287; 409/264; 384/45; 384/624; 74/424.92
(58) Field of Search ................ 409/244, 247, 409/254, 255, 257, 258, 264, 265, 268, 270, 281, 285, 287, 251, 269; 384/50, 54, 624, 45, 44; 74/424.91, 424.92

(56) References Cited

U.S. PATENT DOCUMENTS

| | | | | |
|---|---|---|---|---|
| 206,648 A | * | 7/1878 | Tucker | 384/47 |
| 2,488,256 A | * | 11/1949 | Anderson | 74/424.91 |
| 2,870,688 A | * | 1/1959 | Bonnafe | 409/268 |
| 2,896,514 A | * | 7/1959 | Rosenberg | 409/261 |
| 3,101,623 A | * | 8/1963 | Hayes | 74/424.91 |
| 3,708,736 A | * | 1/1973 | Hoshina et al. | 318/632 |
| 3,726,151 A | * | 4/1973 | Lemor | 74/424.92 |
| 3,859,003 A | * | 1/1975 | Schulz et al. | 409/281 |
| 4,401,401 A | | 8/1983 | Roseliep | |
| 4,576,057 A | * | 3/1986 | Saari | 74/424.92 |
| 4,607,893 A | * | 8/1986 | Damico | 384/45 |
| 4,801,226 A | * | 1/1989 | Gleason | 409/267 |
| 4,917,551 A | | 4/1990 | Roseliep | |
| 5,021,941 A | * | 6/1991 | Ford et al. | 318/632 |
| 5,161,926 A | * | 11/1992 | Schulz | 384/53 |
| 5,167,603 A | * | 12/1992 | Iwaniuk et al. | 409/263 |
| 5,184,985 A | * | 2/1993 | Varinelli et al. | 409/272 |
| 5,231,888 A | * | 8/1993 | Katahira | 74/89.3 |
| 5,315,750 A | | 5/1994 | Roseliep | |
| 5,362,156 A | * | 11/1994 | Hara | 384/45 |
| 5,450,771 A | | 9/1995 | Carter et al. | |
| 5,635,808 A | | 6/1997 | Roseliep | |

(List continued on next page.)

FOREIGN PATENT DOCUMENTS

JP    63-237810 A  * 10/1988

OTHER PUBLICATIONS

Del Toro et al., "Principles of Control Systems Engineering", McGraw–Hill Book Company, Inc., 1960, pp. 9–18.*

(List continued on next page.)

Primary Examiner—A. L. Wellington
Assistant Examiner—Erica E Cadugan
(74) Attorney, Agent, or Firm—Brooks Kushman P.C.

(57) ABSTRACT

A linear blind broaching machine (10) includes a base (22), a broaching ram assembly (24), a linear tool slide (26) supported on the base by linear antifriction bearings (90) and a support block (92) mounted between the base and the linear tool slide below a broaching ram of the broaching ram assembly to provide support to the linear tool slide during blind broaching. The linear tool slide has an elongated construction including an elongated positioning block (114) against which blind broaches are laterally positioned, and an electric servomotor (108) drives the linear tool slide (26) to provide indexing thereof between broaching movements of the broaching ram. A roller screw drive (54) driven by an electric servomotor (56) drives a broaching ram (44) supported by linear antifriction bearings 46.

4 Claims, 7 Drawing Sheets

U.S. PATENT DOCUMENTS

| | | | |
|---|---|---|---|
| 5,637,940 A | * 6/1997 | Nagai et al. | 74/89.32 |
| 5,682,658 A | 11/1997 | Roseliep | |
| 5,711,611 A | * 1/1998 | Nagai et al. | 384/54 |
| 5,743,653 A | * 4/1998 | Katoh | 348/45 |
| 5,876,163 A | * 3/1999 | Nemeth et al. | 409/260 |
| 5,878,642 A | 3/1999 | Roseliep | |
| 5,919,015 A | 7/1999 | Mason et al. | |
| 6,170,351 B1 | * 1/2001 | Zernickel | 74/424.92 |
| 6,336,744 B1 | * 1/2002 | Rehm et al. | 384/45 |

OTHER PUBLICATIONS

McGraw–Hill Concise Encyclopedia of Science & Technology, $4^{th}$ ed., 1997, p. 1746.*

McGraw–Hill Dictionary of Scientific and Technical Terms, $5^{th}$ ed., 1994, p. 1801.*

Marks' Handbook for Mechanical Engineers, $9^{th}$ ed., New York, 1987, p. 13–67.*

* cited by examiner

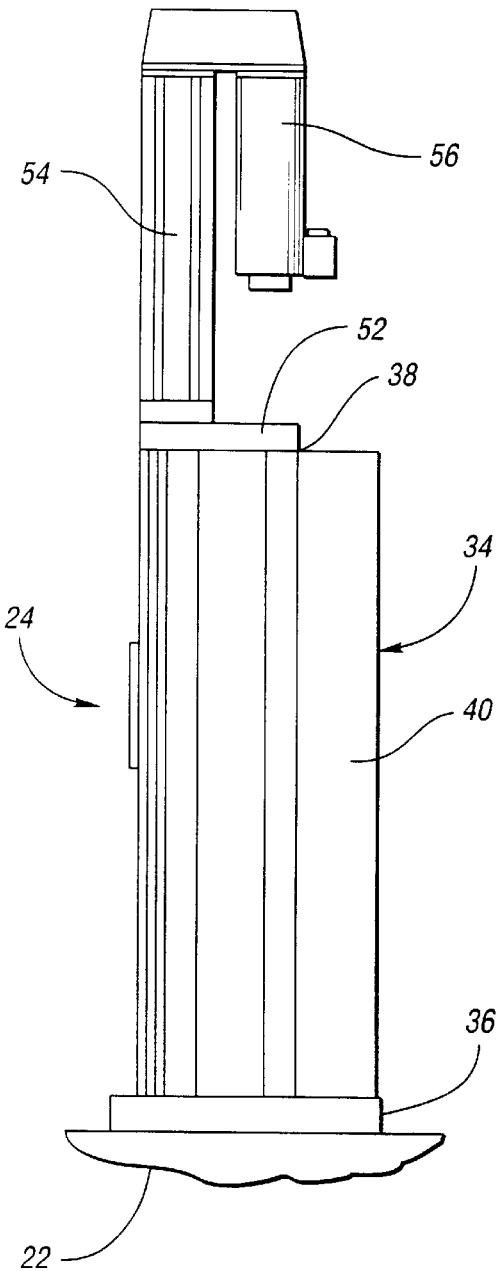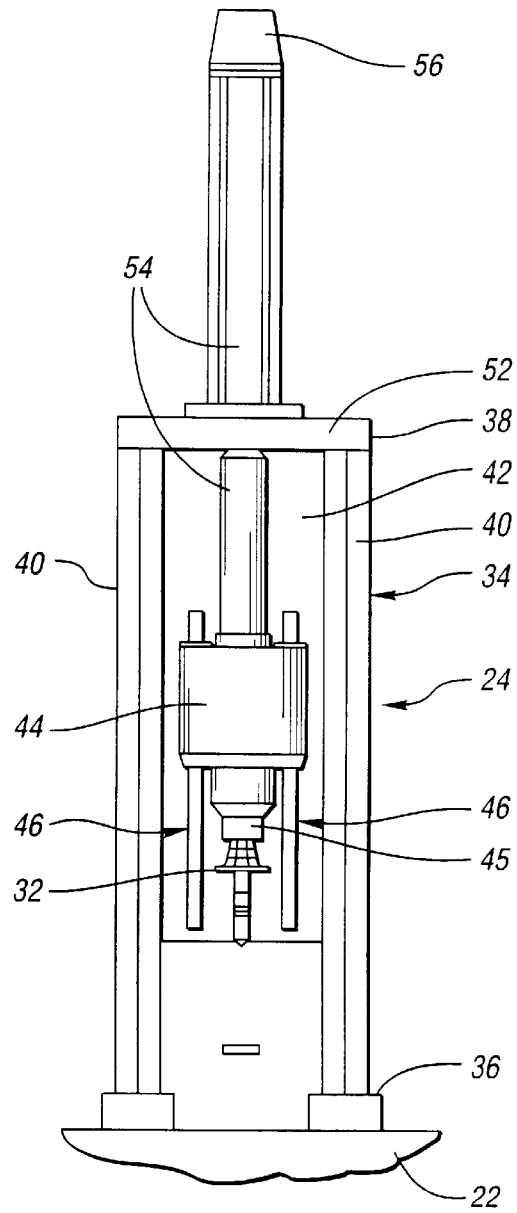

LINEAR BLIND BROACHING MACHINE

BACKGROUND OF THE INVENTION

1. Field of the Invention

This invention relates to a linear blind broaching machine for progressively broaching blind shapes in a workpiece.

2. Background Art

Blind broaching machines for the most part in the past have utilized rotary tables on which progressive tools are mounted to provide progressive broaching of a blind shapes in a workpiece. Such blind broaching may be used to form splines or other shapes and may be either internally within a blind hole or externally adjacent a flange as other external blind formation. The workpiece is conventionally held by a vertically moving ram that is mounted on a ram support of a ram assembly and the progressive tools are mounted on the rotary table such that rotary indexing thereof moves the next tool below the workpiece whose downward movement on the ram then provides the next broaching step in the progressive blind broaching. Such rotary blind broaching is disclosed by U.S. Pat. Nos. 4,401,401 Roseliep and 4,917,551 Roseliep. Also, rotary index tables that can be utilized in such rotary blind broaching are disclosed by U.S. Pat. Nos. 5,450,771 Carter et al., 5,635,808 Roseliep and 5,682,658 Roseliep.

A tool holder that can be utilized in blind broaching is disclosed by U.S. Pat. No. 5,878,642 Roseliep, and a loading/unloading system utilized in blind broaching is disclosed by U.S. Pat. No. 5,315,750 Roseliep. Also, a mechanical drive linkage for a ram of a blind broaching machine is disclosed by U.S. No. Pat. No. 5,919,015 Mason et al.

Progressive blind broaching machines have also previously been of the linear type having a linear tool slide that is mounted on a base for horizontal indexing movement below a broaching ram of the broaching ram assembly. The broaching ram is mounted for vertical movement on a ram support and supports the workpiece. Each downward stroke of the broaching ram provides blind broaching and upon subsequent upward movement, the linear tool slide is indexed horizontally in a rectilinear direction to present the next tool below the workpiece for the next progressive broaching stroke.

SUMMARY OF THE INVENTION

An object of the present invention is to provide an improved linear blind broaching machine.

In carrying out the above object, the linear blind broaching machine includes a base for mounting on a factory floor and the broaching ram assembly including a ram support extending upwardly from the base. The broaching ram assembly includes a broaching ram mounted by the ram support for vertical movement that moves a workpiece to be blind broached.

According to one aspect of the invention, a pair of spaced linear antifriction bearings including roller elements support the linear tool slide on the base for horizontal indexing movement under the broaching ram for progressive blind broaching of the workpiece. Each linear antifriction bearing includes an elongated guideway mounted on the base in a spaced and parallel relationship to the guideway of the other linear antifriction bearing. Each antifriction bearing also includes a roller carriage on which the linear tool slide is mounted at a spaced location from the other linear antifriction bearing. Each antifriction bearing also includes roller elements that support the roller carriage thereof on its elongated guideway. A support block is mounted between the pair of linear antifriction bearings and between the base and the linear tool slide below the broaching ram to provide support to the linear tool slide during the blind broaching and thereby prevent overloading of the roller elements of the linear antifriction bearings.

In one construction, the support block of the blind broaching machine is fixedly mounted on the base. This fixedly mounted support block preferably has a clearance with the linear tool slide, and the linear tool slide deflects during the broaching to prevent overloading of the roller elements of the antifriction bearings. The linear tool slide includes wear blocks positioned below the blind broaches to engage the fixedly mounted support block and provide support to the linear tool slide during the broaching. In another construction, a wedge is actuated to provide the support of the support block between the base and the linear tool slide during each broaching movement of the broaching ram.

According to another aspect of the invention, the linear tool slide has an elongated construction that extends horizontally to support progressive blind broaches and includes an elongated positioning block having a flat surface against which the blind broaches are positioned so as to be accurately positioned laterally along the elongated direction of the linear tool slide. An electric servomotor of the machine drives the linear tool slide along the linear antifriction bearings to provide indexing thereof between broaching movements of the broaching ram.

The linear blind broaching machine as described immediately above preferably has a set of spring biased locators that position the blind broaches against the flat surface of the elongated positioning block. Furthermore, the machine also preferably includes a set of stops for positioning the blind broaches along the length of the linear tool slide. The set of spring biased locators most preferably position the blind broaches against the flat surface of the elongated positioning block and against the set of stops and thereby establish both lateral and longitudinal positioning of the tool profiles on the linear tool slide.

In accordance with another aspect of the invention, the linear blind broaching machine includes a roller screw drive that connects the ram support and the broaching ram of the broaching ram assembly, and an electric servomotor drives the roller screw drive to move the broaching ram for the linear blind broaching.

The linear blind broaching machine also includes linear antifriction bearings that mount the broaching ram on the ram support for the vertical movement that moves the workpiece to be blind broached. These linear antifriction bearings that mount the broaching ram cooperate with the linear antifriction bearings that support the linear tool slide on the base for horizontal indexing movement under the broaching ram to permit accurate control of the broaching and indexing movements. Furthermore, the actuation of the linear tool slide is effectively performed by the electric servomotor previously mentioned to accurately control the indexing movement.

All aspects of the linear blind broaching machine as described above and when utilized with each other provide efficient and effective blind broaching.

The objects, features and advantages of the present invention are readily apparent from the following detailed description of the invention when taken in connection with the accompanying drawings.

BRIEF DESCRIPTION OF THE DRAWINGS

FIG. 7 is a side view of the ram assembly taken along the direction of line 7—7 in FIG. 6.

FIG. 8 is an end view of the ram assembly taken along the direction of line 8—8 in FIG. 6.

DETAILED DESCRIPTION OF THE PREFERRED EMBODIMENTS

Figure 1:
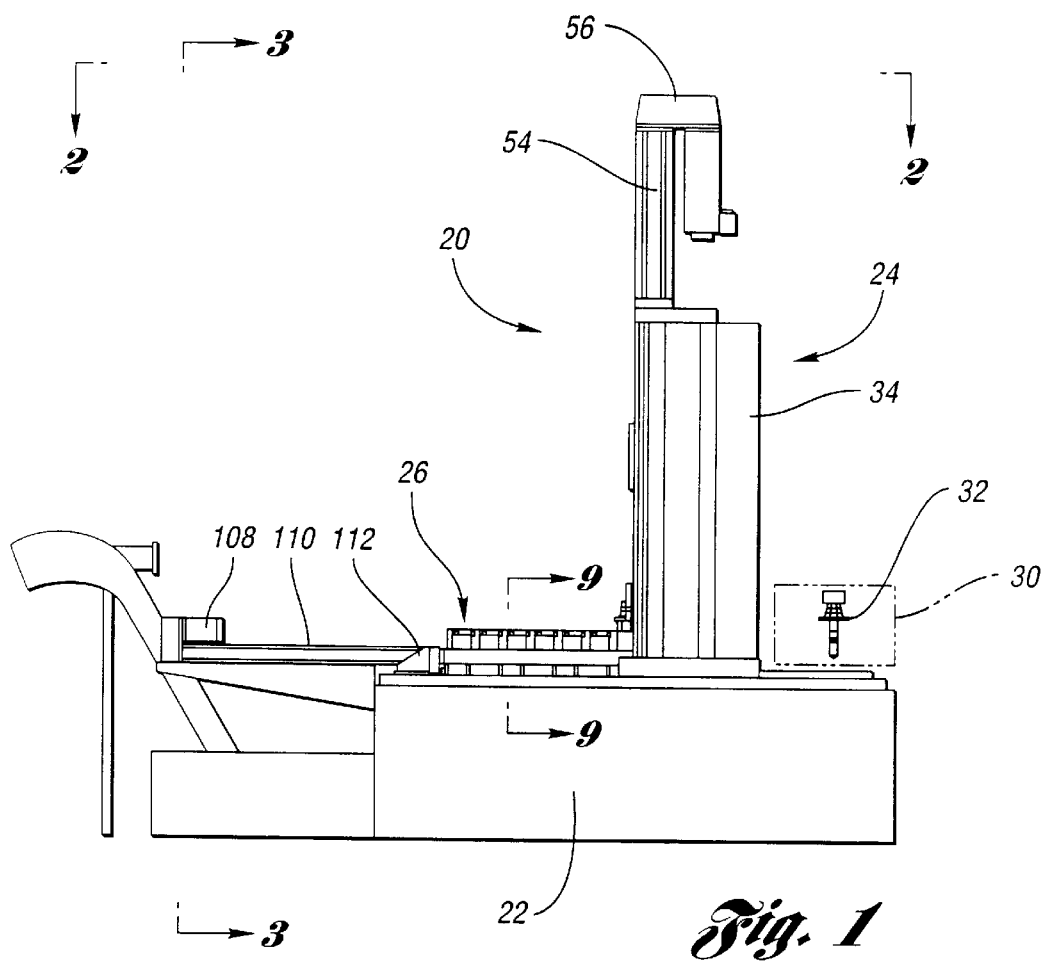
FIG. 1 is a side elevational view of a linear blind broaching machine that is constructed in accordance with the present invention.
Figure 2:
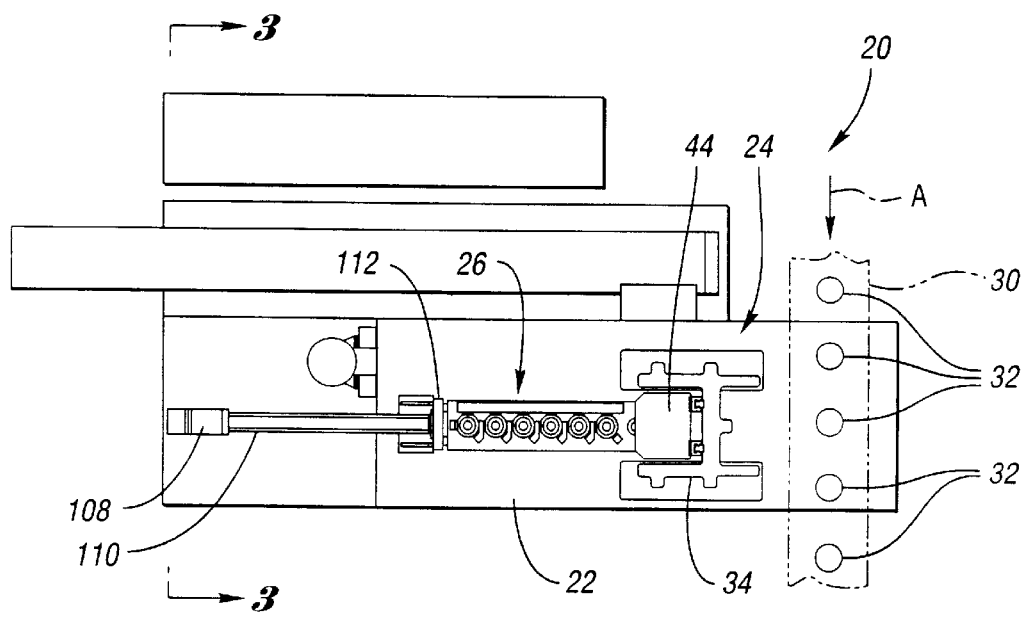
FIG. 2 is a top plan view of the linear blind broaching machine taken along the direction of line 2—2 in FIG. 1 and illustrates that it is of a single ram type.
Figure 3:
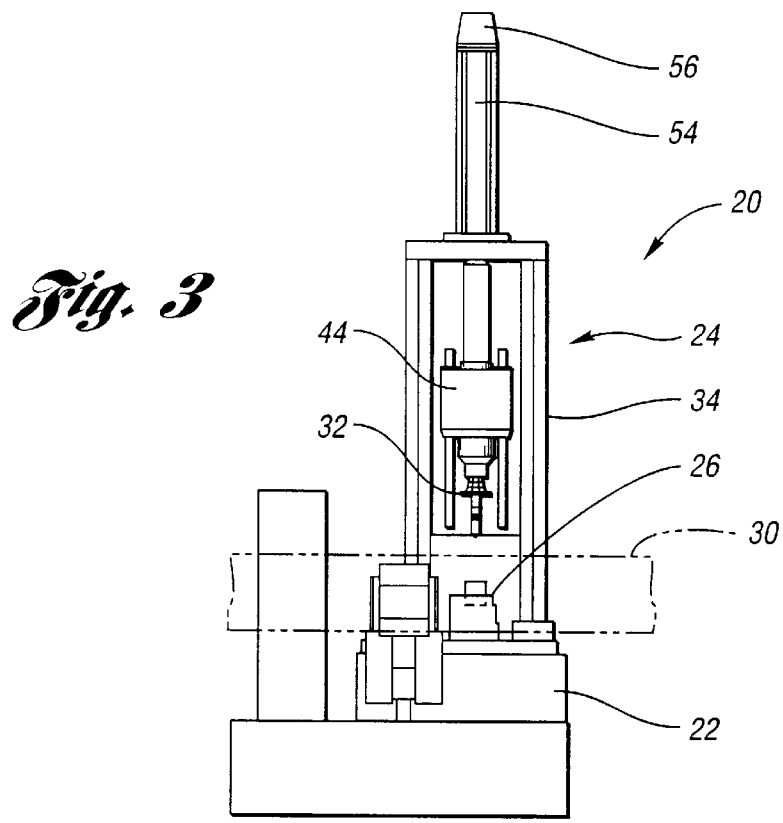
FIG. 3 is an end view of the linear blind broaching machine taken along the direction of line 3—3 in FIG. 2 to further illustrate its construction.

With reference to FIGS. 1–3, one embodiment of a linear blind broaching machine constructed in accordance with the invention is generally indicated by 20 and includes a base 22, a broaching ram assembly 24 mounted on the base in an upstanding manner, and an elongated linear tool slide 26 that is movable horizontally on the base for indexing that provides progressive blind broaching in cooperation with of the ram assembly as is hereinafter more fully described. A workpiece conveyor 30 of any conventional type conveys workpieces 32 along the direction shown by arrow A in FIG. 2, although it could also be in the opposite direction. As is hereinafter more fully described, the workpieces 32 to be progressively blind broached are received from the conveyor 30 by the linear tool slide 26 which is then indexed to the broaching ram assembly 24 to be received thereby for subsequent blind broaching in a progressive manner by the cooperation of the ram assembly 24 and indexing of the linear tool slide 26. After the progressive blind broaching of each workpiece, it is delivered back to the conveyor 30 and another workpiece is then loaded for the next cycle.

Figure 4:
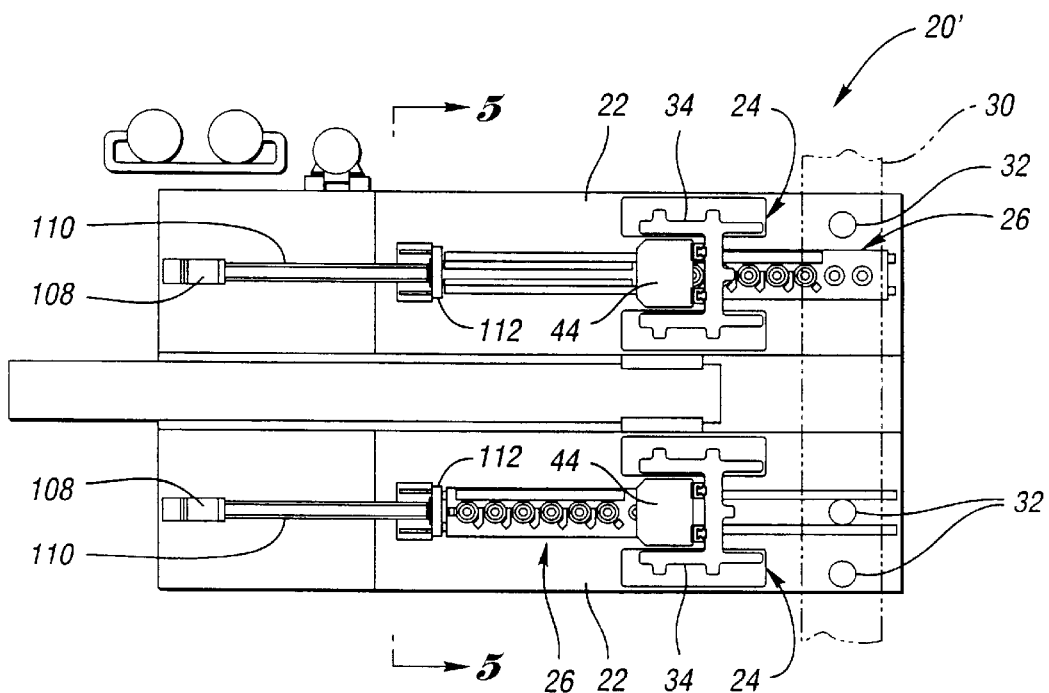
FIG. 4 is a top plan view taken in the same direction as FIG. 2 but illustrating another embodiment of the linear blind broaching machine which is of the dual ram type.
Figure 5:
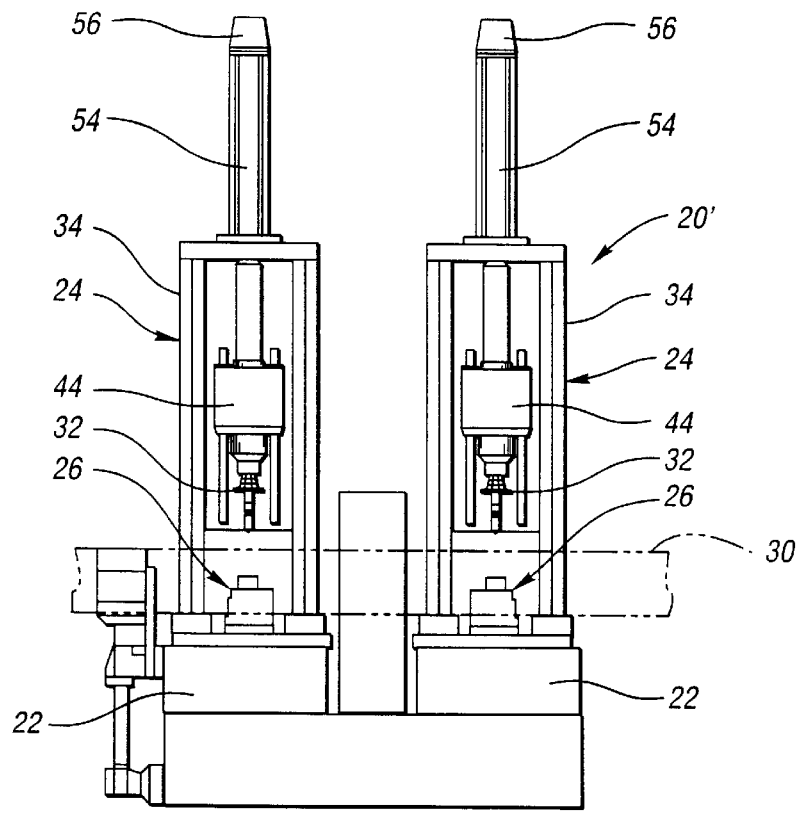
FIG. 5 is an end view of the dual ram blind broaching machine taken along the direction of line 5—5 in FIG. 4.

With reference to FIGS. 4 and 5, another embodiment of the linear blind broaching machine for performing progressive broaching of blind holes with linear indexing is indicated generally by 20' and has the same construction of the machine illustrated in FIGS. 1–3 except that it has a dual ram construction including two ram assemblies 24 and associated elongated linear tool slides 26 that provide the progressive blind broaching in a side-by-side relationship to each other as opposed to the embodiment described above where there is only a single ram and associated linear tool slide. With this dual ram construction, the cyclic operation of the two progressive blind broaching operations are offset by one half cycle from each other to facilitate the loading and unloading of the workpieces 32 by the load conveyor 30. Otherwise, the construction of each ram assembly 24 and elongated linear tool slide 26 and their cooperative operation with each other are the same as is hereinafter more fully described.

Figure 6:
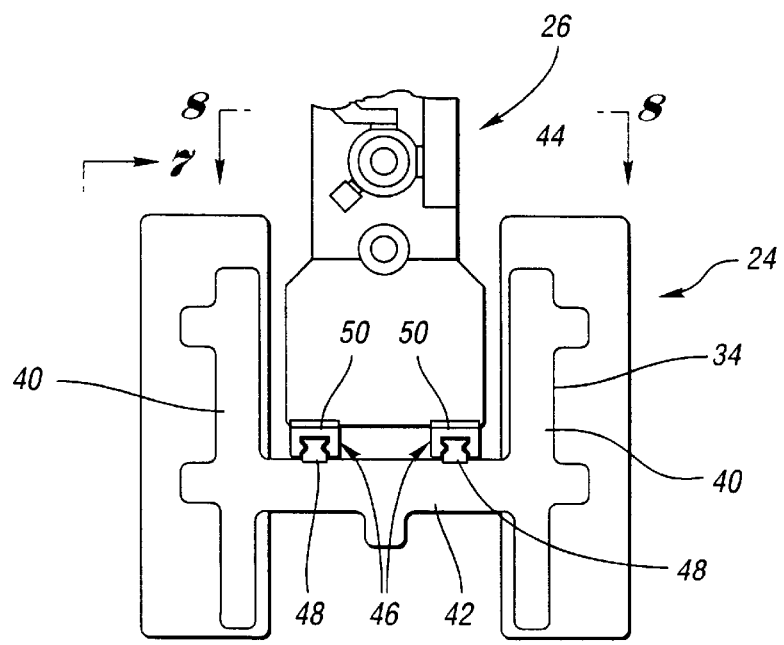
FIG. 6 is a top plan view taken on an enlarged scale illustrating the construction of a ram assembly of the machine which can be utilized with either the single ram type of FIGS. 1–3 or the dual ram type of FIGS. 4 and 5.

With reference to FIGS. 6–8, the broaching ram assembly 24 includes a ram support 34 having a lower end 36 that is mounted on the base 22 with the ram support extending upwardly therefrom to an upper end 38. Between its lower and upper ends, the ram support 34 has a generally H-shaped construction as shown in FIG. 6. More specifically, the ram support 34 includes a pair of side portions 40 and a connecting web 42 that extends between the side portions.

Figure 10:
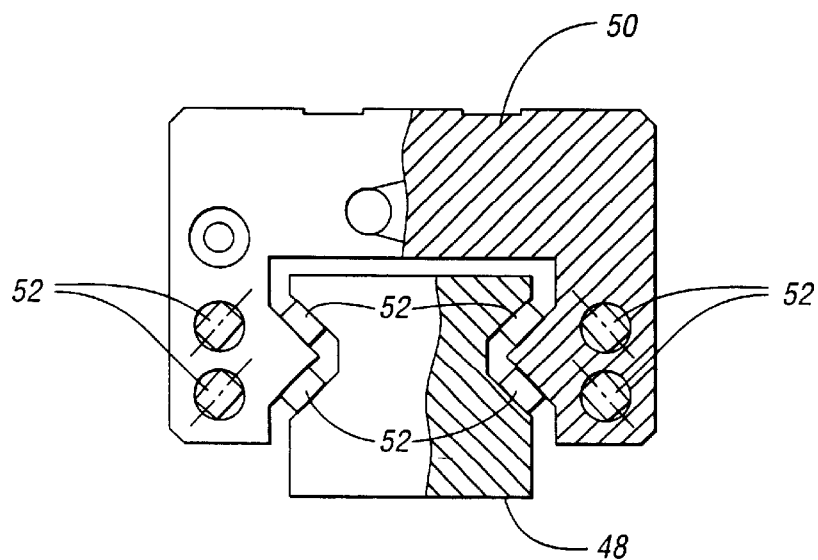
FIG. 10 is a partially sectional view taken through one of the linear antifriction bearings to illustrate the construction thereof and roller elements that provide support of carriage blocks along guideways of the linear antifriction bearings.

With continuing reference to FIGS. 6 and 8, the broaching ram assembly 34 includes a broaching ram 44 mounted by the ram support 34 on its web 42 for vertical movement. A chuck 45 mounts the workpiece on the broaching ram 44 for the blind broaching as is hereinafter more fully described. More specifically, the broaching ram 44 is mounted by a pair of linear antifriction bearings 46 for the vertical movement. These linear antifriction bearings are of the type illustrated in FIG. 10 including an elongated guideway 48 that mounts one or more roller carriages 50 by roller elements 52 that move in a recirculating manner so as to provide the antifriction support of the broaching ram for its vertical movement.

Figure 14:
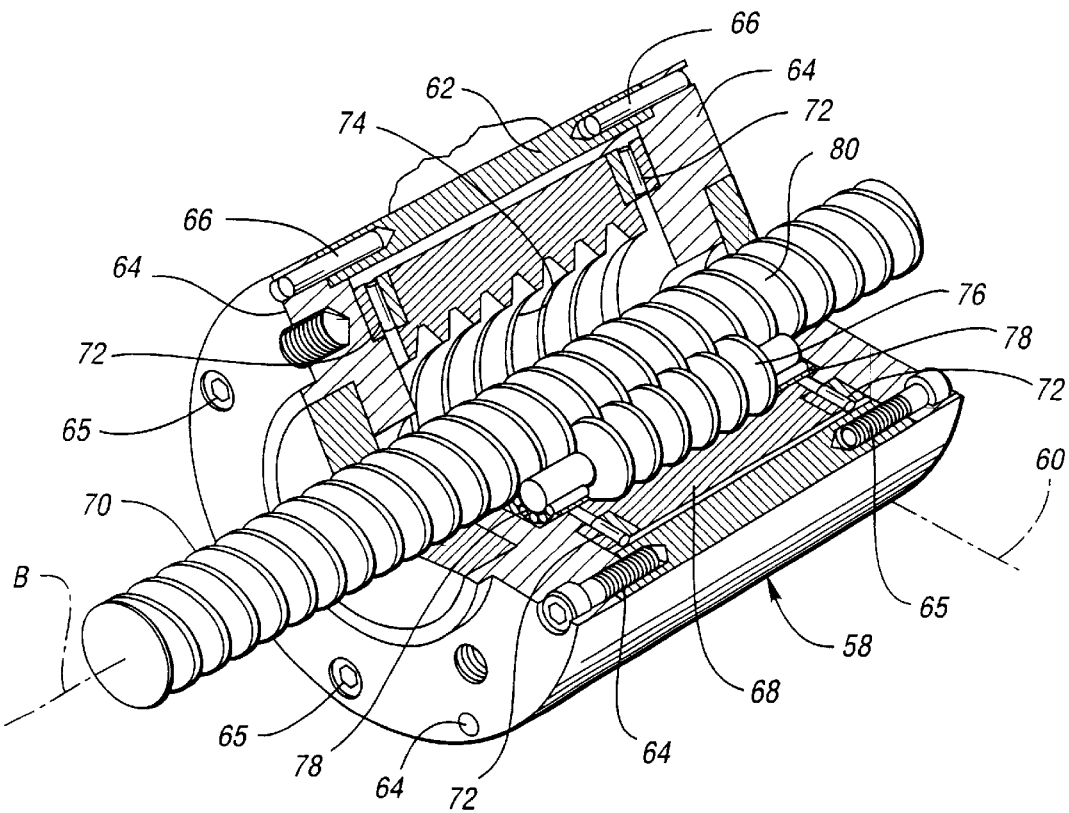
FIG. 14 is a perspective view partially broken away in section to illustrate the construction of a roller screw drive of the type utilized to drive the linear tool slide and to also provide the broaching ram driving.

As illustrated in FIGS. 7 and 8, the upper end 38 of the ram support 34 includes a plate 52 that extends over the support and mounts a screw drive embodied by a roller screw drive 54 that extends to the broaching ram 44 and thus connects the ram support and the broaching ram 44. An electric servomotor 56 (FIG. 7) rotatively drives the roller screw drive 54 which has a construction as illustrated in FIG. 14 including a roller screw nut 58 that is rotatively driven by the electric servomotor through a schematically illustrated belt 60.

The roller screw nut 58 has a housing including an elongated annular housing member 62 as well as opposite end members 64 that are secured to the housing member 62 by bolts 65 in association with alignment pins 66. A planet carrier 68 is rotatably supported about the axis B of a screw 70 by bearing elements embodied by rollers 72 and has a central threaded interior including threads 74. Planet screws 76 are rotatably supported by antifriction bearings 78 and are in threaded engagement with both a thread 80 of the screw 70 and the thread 74 of the planet carrier 68. Actually, there are a number of planet screws 76, normally arranged equally spaced with respect to each other about screw 70, even though only one is illustrated. The screw 70 is connected to the broaching ram such that rotation of the nut 58 under the impetus of the associated electric servomotor through the threaded construction illustrated moves the screw axially and thereby moves the broaching ram vertically to provide the broaching operation.

As illustrated in FIGS. 1, 2, 4, 12 and 13, the elongated linear tool slide 26 extends horizontally to support progressive blind broaches $82_a$, $82_b$, $82_c$, $82_d$, $82_e$ and $82_f$. A loading station 84 is positioned adjacent the first broach $82_a$ for receiving a workpiece 32 to be broached and may include an arbor 86 that provides alignment with the broaching ram to receive the workpiece as the cycle commences. The elongated linear tool slide 26 also includes an unloading station 88 from which the broached workpieces are unloaded as is hereinafter more fully described.

Figure 9:
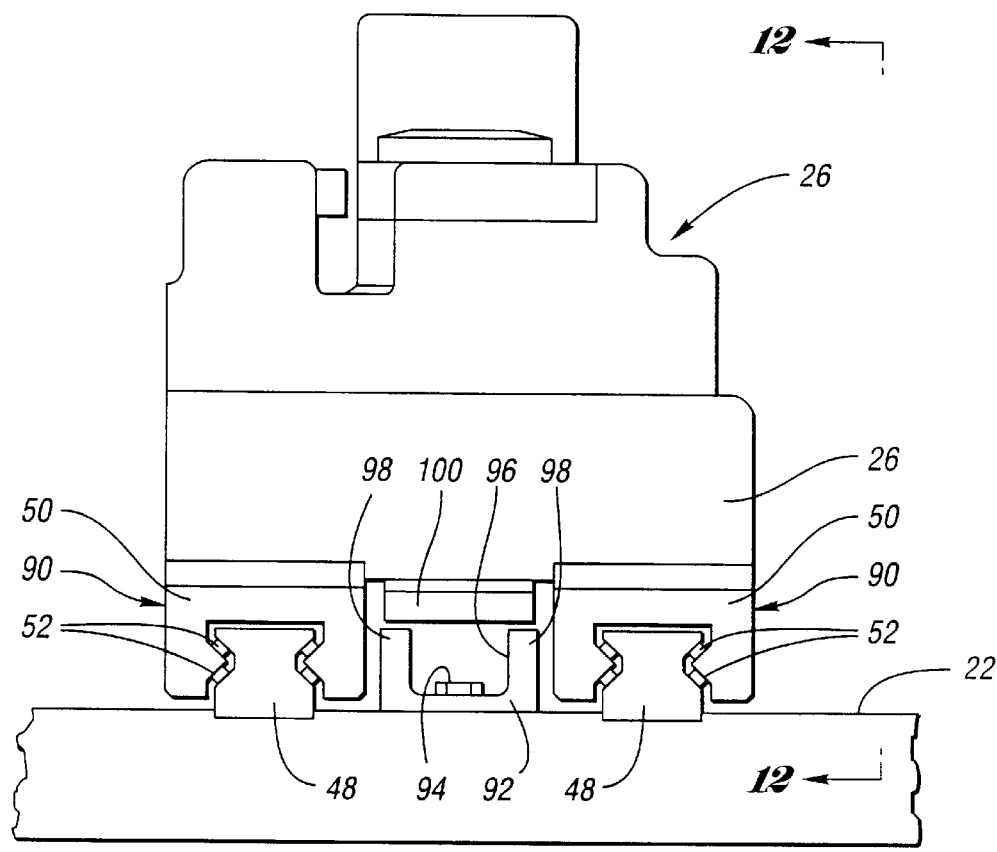
FIG. 9 is a view taken along the direction of line 9—9 in FIG. 1 to illustrate the manner in which a linear tool slide of the machine is mounted by linear antifriction bearings and is reinforced by a support block during the broaching operation to prevent damage of the linear antifriction bearings.

As illustrated in FIG. 9, linear antifriction bearings 90 support the linear tool slide 26 on the base 22 for horizontal indexing movement under the broach ram previously described in order to perform the progressive blind broaching of the workpiece. These linear antifriction bearings 90 are of the same construction as previously described in connection with FIG. 10 so as to include elongated guideways 48 that are mounted by the base 22, and roller carriages 50 secured to the tool slide 26 are supported for movement along the guideways 48 by recirculating roller elements 52 as previously described in connection with FIG. 10.

Figure 12:
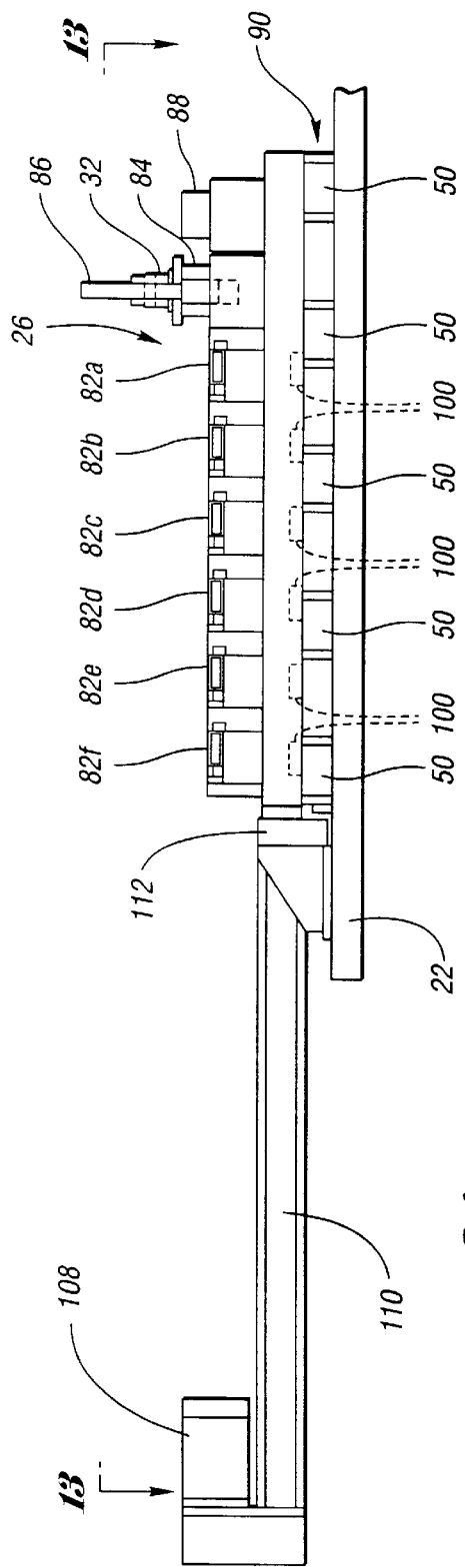
FIG. 12 is a side elevational view of the linear tool slide taken along the direction of line 12—12 in FIG. 9 and also illustrates a roller screw drive and electric servomotor that cooperatively drive the linear tool slide for indexing movement.

With continuing reference to FIG. 9, between the pair of linear antifriction bearings 90 illustrated, a support block 92 is mounted between the base 22 and the linear tool slide 26 and is located below the broaching ram to provide support to the linear tool slide during the blind broaching in order to thereby prevent overloading of the roller elements of the linear antifriction bearings. More specifically, as illustrated, the support block 92 is fixedly mounted on the base 22 and is secured in any suitable manner such as by one or more threaded bolts 94. The support block 92 as illustrated defines an opening 96 in which machine chips can fall and accumulate without interfering with the broaching operation. The support block has legs 98 that extend upwardly from the base 22 and have upper ends that have a clearance with the linear tool slide 26. This clearance can be quite small, on the order of a fraction to several thousandths of an inch, and deflection of the tool slide during the pressure applied to it by the broaching ram will cause engagement thereof with the upper end of the legs 98 of the support block 92 in order to provide the support that prevents overloading of the roller elements of the linear antifriction bearings. As illustrated in FIG. 12, below each of the progressive blind broaches $82_a$ through $82_f$, the linear tool slide 26 includes wear plates 100 to engage the fixedly mounted support block 92 as previously described and provide support to the linear tool slide during the broaching. While it is possible for the support to be provided with a support block that has a slight interference fit as opposed to the clearance as previously described, utilization of the clearance is preferable in order to prevent any binding of the linear tool slide 26 during indexing from one broach to the next.

Figure 11:
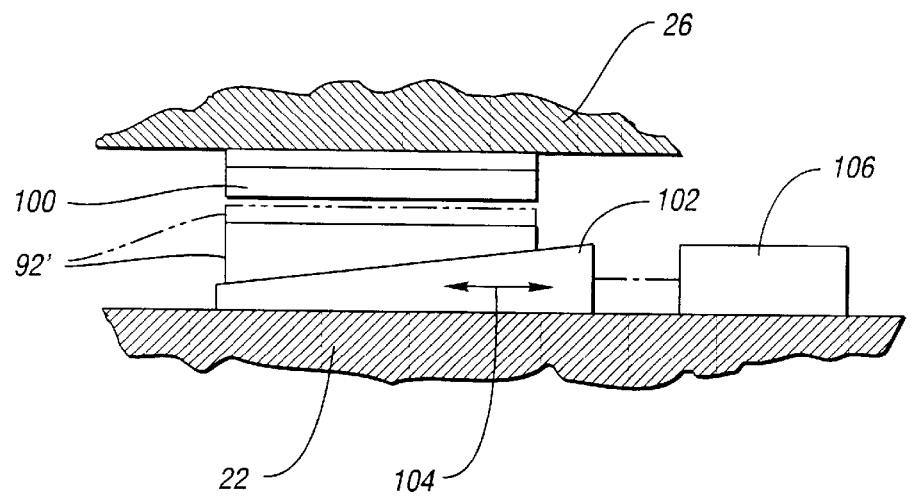
FIG. 11 is a somewhat schematical view illustrating the manner in which a support block may be moved by an actuator after each indexing cycle to engage and support the linear tool slide.

With reference to FIG. 11, an alternate embodiment of the support block 92' includes a wedge 102 that is movable as shown by arrows 104 under the control of an actuator 106 to raise and lower the support block 92' between the solid and phantom line indicated positions. Thus, the wedge 102 is moved to the right to lower the support block 92' for the indexing, and the wedge 102 is moved toward the left to raise the wedge 92' to the phantom line indicated position in engagement with linear tool side 26 at its wear plate 100 in order to provide the support during the broaching operation.

As illustrated in FIGS. 1, 2, 4, 12 and 13, an electric servomotor 108 is connected to a screw drive embodied by a roller screw drive 110 of the same construction previously described in connection with FIG. 14. The roller screw drive 110 is mounted by a base portion 112 and is connected to the linear tool slide 26 such that operation of the servomotor 108 provides horizontal movement of the tool slide under the broaching ram for indexing between each successive step of the progressive blind broaching operation.

Figure 13:
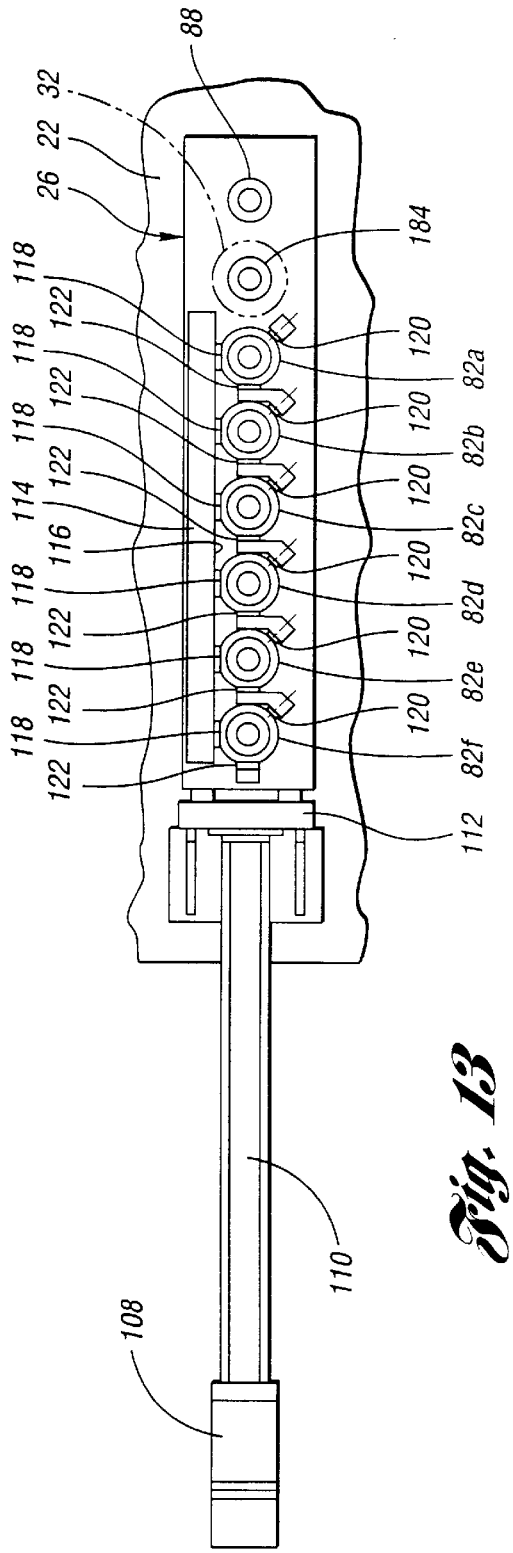
FIG. 13 is a top plan view of the linear tool slide taken along the direction of line 13—13 in FIG. 12.

As illustrated in FIG. 13, the elongated tool slide 26 includes an elongated positioning block 114 having a flat surface 116 against which the blind broaches $82_a$ through $82_f$ are positioned so as to be accurately positioned laterally along the elongated direction of the linear tool slide. This positioning can be directly against the flat surface 116 of the positioning block or through the use of positioners 118 mounted on the positioning block. A set of spring biased locators 120 bias the blind broaches $82_a$ through $82_f$ against the flat surface 116 of the positioning block 114, either directly or through the positioners 118. A set of stops 122 on the linear tool slide 26 provide positioning of the blind broaches $82_a$ through $82_f$ along the elongated length of the tool slide. The spring biased locators 120 preferably position the blind broaches $82_a$ through $82_f$ against both the flat surface 116 of the positioning block 114 and against the set of stops 122 by applying a force that defines an angle of about 45° with respect to the elongated direction of the tool slide. Through the use of lateral positioning by the elongated positioning block 114 described above and longitudinal positioning for indexing provided by the electric servomotor 108, accurate location of the blind broaches with respect to the broaching ram is achieved without requiring extensive adjustment. Specifically, the elongated positioning block 114 can be easily adjusted to accurately locate all of the blind broaches laterally, and the electric servomotor can be programmed to insure that any nonuniformity in the space between the longitudinal stops 122 can be accommodated for by the extent to which the linear slide is indexed from one broaching step to the next.

A cycle of the broaching machine will now be described. The cycle begins with the linear tool slide positioned in its farthest position toward the right just after a previously splined part has been unloaded from the unloading station 88 and with the loading station 84 aligned with the conveyor 30 to receive the next workpiece to be broached while the last blind broach $82_f$ is aligned with the broaching ram to provide the last step of the blind broaching on a workpiece mounted by the ram and in the process of being broached. The linear tool slide 26 is then moved by the electric servomotor 108 through the roller screw drive 110 to its fully retracted position where the unloading station 88 is aligned with the broaching ram to receive the previously broached workpiece from the broaching ram chuck upon downward ram movement. Upward movement of the broaching ram is then followed by an index cycle toward the right of the linear tool slide 26 so the loading station 84 is aligned with the broaching ram chuck and downward movement thereof to receive the next workpiece to be broached is then followed by upward movement and an indexing cycle of the tool slide that moves the first blind broach $82_a$ into alignment with the broaching ram. The actual broaching of this next workpiece starts as the broaching ram is then moved downwardly for the broaching by the first blind broach $82_a$ and upward movement thereof is then followed by another index of the tool slide 26 toward the right for the broaching by the next blind broach 82$_b$. The progressive broaching proceeds until the unloading station 88 is aligned with the conveyor to deliver the previously splined workpiece as the second to last broaching step takes place at the blind broach 82$_e$. Subsequent indexing fully toward the right positions the loading station 84 with respect to the conveyor to receive the next workpiece to be broached as the last broaching step is performed by the blind broach 82$_f$.

It should be appreciated that while six of the blind broaches for providing the progressive blind broaching are illustrated, other numbers of the broaches can be utilized as necessitated by the particular workpiece to be blind broached.

While the best modes for performing the invention have been described in detail, those familiar with the art to which the invention relates will recognize various alternative designs and embodiments for practicing the invention as defined by the following claims.

What is claimed is:

1. A linear blind broaching machine comprising:
   a base for mounting on a factory floor;
   a broaching ram assembly including a ram support extending upwardly from the base;
   the broaching ram assembly including a broaching ram mounted by the ram support for vertical movement that moves a workpiece to be blind broached;
   a linear tool slide that extends horizontally to support progressive blind broaches;
   a pair of spaced linear antifriction bearings that support the linear tool slide on the base for horizontal indexing movement under the broaching ram for progressive blind broaching of the workpiece, each linear antifriction bearing including an elongated guideway mounted on the base in a spaced and parallel relationship to the guideway of the other linear antifriction bearing, each antifriction bearing including a roller carriage on which the linear tool slide is mounted at a spaced location from the roller carriage of the other linear antifriction bearing, and each antifriction bearing including roller elements that support the roller carriage thereof on its elongated guideway; and
   a support block fixedly mounted on the base between the pair of linear antifriction bearings and between the base and the linear tool slide below the broaching ram, the fixedly mounted support block having a clearance with the linear tool slide, the linear tool slide including wear plates positioned below the blind broaches, and the linear tool slide deflecting during the broaching to engage the wear plates and the support block to provide support to the linear tool slide from the base during the blind broaching and thereby prevent overloading of the roller elements of the pair of linear antifriction bearings.

2. A linear blind broaching machine comprising:
   a base for mounting on a factory floor;
   a broaching ram assembly including a ram support extending upwardly from the base;
   the broaching ram assembly including a broaching ram mounted by the ram support for vertical movement that moves a workpiece to be blind broached;
   a linear tool slide that extends horizontally to support progressive blind broaches;
   a pair of spaced linear antifriction bearings that support the linear tool slide on the base for horizontal indexing movement under the broaching ram for progressive blind broaching of the workpiece, each linear antifriction bearing including an elongated guideway mounted on the base in a spaced and parallel relationship to the guideway of the other linear antifriction bearing, each antifriction bearing including a roller carriage on which the linear tool slide is mounted at a spaced location from the roller carriage of the other linear antifriction bearing, and each antifriction bearing including roller elements that support the roller carriage thereof on its elongated guideway;
   a support block mounted between the pair of linear antifriction bearings and between the base and the linear tool slide below the broaching ram to provide support to the linear tool slide from the base during the blind broaching and thereby prevent overloading of the roller elements of the pair of linear antifriction bearings; and
   a wedge that is actuated to provide the support of the support block between the base and the linear tool slide during each broaching movement of the broaching ram.

3. A linear blind broaching machine comprising:
   a base for mounting on a factory floor;
   a broaching ram assembly including a ram support extending upwardly from the base and a broaching ram mounted by the support for vertical movement that moves a workpiece to be blind broached;
   an elongated linear tool slide that extends horizontally to support progressive blind broaches, and the elongated tool slide including an elongated positioning block having a flat surface against which the blind broaches are positioned so as to be accurately positioned laterally along the elongated direction of the linear tool slide;
   a set of spring biased locators that position the blind broaches against the flat surface of the elongated positioning block;
   linear antifriction bearings including roller elements that support the linear tool slide on the base for horizontal indexing movement under the broaching ram for progressive blind broaching of the workpiece; and
   an electric servomotor that drives the linear tool slide to provide indexing thereof between broaching movements of the broaching ram.

4. A linear blind broaching machine comprising:
   a base for mounting on a factory floor;
   a broaching ram assembly including a ram support extending upwardly from the base and a broaching ram mounted by the support for vertical movement that moves a workpiece to be blind broached;
   an elongated linear tool slide that extends horizontally to support progressive blind broaches, and the elongated tool slide including an elongated positioning block having a flat surface against which the blind broaches are positioned so as to be accurately positioned laterally along the elongated direction of the linear tool slide;
   a set of stops for positioning the blind broaches along the length of the linear tool slide, and a set of spring biased locators that position the blind broaches against the flat surface of the elongated positioning block and against the set of stops;
   linear antifriction bearings including roller elements that support the linear tool slide on the base for horizontal indexing movement under the broaching ram for progressive blind broaching of the workpiece; and
   an electric servomotor that drives the linear tool slide to provide indexing thereof between broaching movements of the broaching ram.

* * * * *